United States Patent
Ohya et al.

(10) Patent No.: US 12,243,212 B2
(45) Date of Patent: Mar. 4, 2025

(54) IMAGING SYSTEM

(71) Applicant: CANON KABUSHIKI KAISHA, Tokyo (JP)

(72) Inventors: Takeru Ohya, Tokyo (JP); Satoru Shingai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 17/524,370

(22) Filed: Nov. 11, 2021

(65) Prior Publication Data

US 2022/0067917 A1    Mar. 3, 2022

Related U.S. Application Data

(63) Continuation of application No. PCT/JP2020/018773, filed on May 11, 2020.

(30) Foreign Application Priority Data

May 15, 2019 (JP) ................... 2019-092304

(51) Int. Cl.
*G06T 7/00* (2017.01)
*G06T 1/20* (2006.01)
(Continued)

(52) U.S. Cl.
CPC ............. *G06T 7/0004* (2013.01); *G06T 1/20* (2013.01); *G06T 1/60* (2013.01); *G06V 20/52* (2022.01)

(58) Field of Classification Search
CPC .......... G06T 7/0004; G06T 1/20; G06T 1/60; G06T 2207/10016; G06T 2207/20081;
(Continued)

(56) References Cited

U.S. PATENT DOCUMENTS

2005/0151852 A1* 7/2005 Jomppanen .......... H04N 5/0733
348/E5.015
2008/0080748 A1* 4/2008 Sukegawa .............. G06V 40/10
382/118
(Continued)

FOREIGN PATENT DOCUMENTS

JP    H08315112 A    11/1996
JP    H11146390 A    5/1999
(Continued)

OTHER PUBLICATIONS

Shah, Jamal Hussain, Mingqiang Lin, and Zonghai Chen. "Multi-camera handoff for person re-identification." Neurocomputing 191 (2016): 238-248. (Year: 2016).*

(Continued)

*Primary Examiner* — Carol Wang
(74) *Attorney, Agent, or Firm* — Canon U.S.A., Inc. IP Division (57) ABSTRACT

A first imaging device and a second imaging device are configured to directly receive a signal from a trigger generation circuit. A processing device processes first image data captured by the first imaging device in response to a first trigger signal, and second image data captured by the second imaging device in response to a second trigger signal. The first trigger signal and the second trigger signal are signals generated to start capturing images at the same time point. The processing device performs recognition processing of a target included in the first image data and the second image data.

15 Claims, 6 Drawing Sheets

(51) Int. Cl.
*G06T 1/60* (2006.01)
*G06V 20/52* (2022.01)

(58) Field of Classification Search
CPC .......... G06T 2207/20084; G06T 2207/30164; G06V 20/52; G06V 10/25; G06V 2201/06; H04N 7/181; H04N 23/66; H04N 23/61; H04N 23/90
See application file for complete search history.

(56) References Cited

U.S. PATENT DOCUMENTS

| | | | | |
|---|---|---|---|---|
| 2013/0307977 | A1* | 11/2013 | Saporetti | G06K 7/10861 348/143 |
| 2014/0118333 | A1 | 5/2014 | Ishida | |
| 2016/0189501 | A1* | 6/2016 | Hu | G06T 7/254 348/152 |
| 2018/0225941 | A1* | 8/2018 | Kim | G08B 13/19676 |
| 2019/0108396 | A1* | 4/2019 | Dal Mutto | G06V 20/52 |
| 2020/0098122 | A1* | 3/2020 | Dal Mutto | G06T 17/00 |
| 2020/0283019 | A1* | 9/2020 | van Kampen | G05D 1/0223 |

FOREIGN PATENT DOCUMENTS

| | | | |
|---|---|---|---|
| JP | 2004266458 A | | 9/2004 |
| JP | 2004325308 A | * | 11/2004 |
| JP | 2005027023 A | * | 1/2005 |
| JP | 2006203448 A | | 8/2006 |
| JP | 2010081229 A | | 4/2010 |
| JP | 2010183609 A | | 8/2010 |
| JP | 2013121134 A | | 6/2013 |
| WO | 2018/163644 A1 | | 9/2018 |

OTHER PUBLICATIONS

Zhang, Tan, Aakanksha Chowdhery, Paramvir Bahl, Kyle Jamieson, and Suman Banerjee. "The design and implementation of a wireless video surveillance system." In Proceedings of the 21st annual international conference on mobile computing and networking, pp. 426-438. 2015. (Year: 2015).*

* cited by examiner

IMAGING SYSTEM

CROSS-REFERENCE TO RELATED APPLICATIONS

This application is a Continuation of International Patent Application No. PCT/JP2020/018773, filed May 11, 2020, which claims the benefit of Japanese Patent Application No. 2019-092304, filed May 15, 2019, both of which are hereby incorporated. by reference herein in their entirety.

TECHNICAL FIELD

The present invention relates to an imaging system in which a plurality of imaging devices are used to perform recognition processing of a target in response to an external trigger signal.

BACKGROUND ART

Japanese Patent Laid-Open No. 2010-183609 describes that images of a single subject are captured with a plurality of imaging devices from different angles at the same time point. Specifically, it is described that in response to an instruction being given by a user having a first imaging device, a triggering message (trigger signal) is provided from the first imaging device to a second imaging device and a third imaging device of other users via wireless connection. In response to the trigger signal being provided to the second and third imaging devices, the second and third imaging devices start capturing images at the same time point.

CITATION LIST

Patent Literature

PTL 1 Japanese Patent Laid-Open No. 2010-183609

A system is available for determining whether there are defects in products (workpieces) produced in a factory. In the system, a machine recognizes a defect from image data acquired by an imaging device instead of defect determination being performed by human visual inspection. Since workpieces move along a production line in a factory at a high speed, image data may be acquired with a plurality of imaging devices to prevent failure to capture images of the workpieces in a range.

Some monitoring systems include systems that, in response to events such as intrusion. of suspicious persons, earthquakes, and explosions, recognize the suspicious persons and recognize the state when the events occur (such as identification and counting of persons at an event site at the time of an earthquake). In such a monitoring system, a plurality of imaging devices may be used to acquire image data to simultaneously capture images of a plurality of viewpoints or different places in response to an event.

In such a defect determination system or a monitoring imaging system including a plurality of imaging devices, it is conceivable to apply an imaging system, as described in Japanese Patent Laid-Open No. 2010-183609, in which a trigger signal is provided to a plurality of imaging devices via wireless connection to allow the plurality of imaging devices to start capturing images at the same time point.

In the imaging system. described in Japanese Patent Laid-Open No. 2010-183609, however, after the trigger signal is provided to the second and third imaging devices, the second and third imaging devices start capturing images through software processing performed by central processing units (CPUs) or the like of the second and third imaging devices. For this reason, even when the trigger signal is provided, if the CPUs or the like of the second and third imaging devices are performing other processing and different loads are imposed on the CPUs or the like of the second and third imaging devices, the shutter timings of the second and third imaging devices may be different from each other.

Accordingly, The present invention provides an imaging system capable of synchronizing the shutter timings of a plurality of imaging devices, unlike Japanese Patent Laid-Open No. 2010-183609.

SUMMARY OF INVENTION

An imaging system according to an aspect of the present invention includes a first imaging device configured to receive a first trigger signal from a trigger generation circuit without software processing; a second imaging device configured to receive a second trigger signal from the trigger generation circuit without software processing; a memory configured to hold first image data captured by the first imaging device in response to receipt of the first trigger signal and second image data captured by the second imaging device in response to receipt of the second trigger signal; and a processing device configured to process the first image data and the second image data held in the memory. The first trigger signal and the second trigger signal are signals generated to allow the first imaging device and the second imaging device to start capturing an image at the same time point. The processing device performs recognition processing of a target included in the first image data and the second image data.

Further features of the present invention will become apparent from the following description of exemplary embodiments with reference to the attached drawings.

DESCRIPTION OF EMBODIMENTS

First Embodiment

Figure 1A:
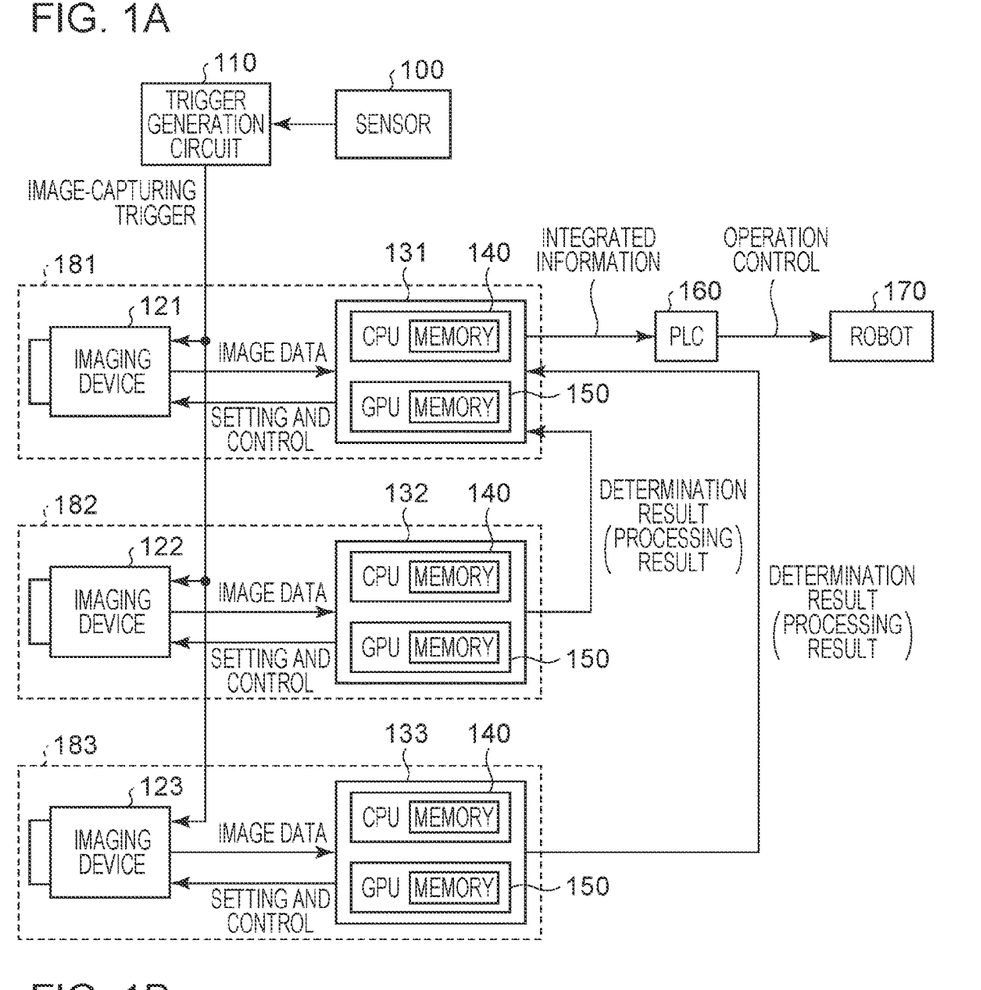
FIG. 1A is a diagram illustrating an overview of an inspection system.

FIG. 1A illustrates a basic configuration of an imaging system according to this embodiment. This embodiment is directed to an inspection system. The imaging system includes three units. Specifically, a first unit 181 includes an imaging device 121 and a processing device 131, a second unit 182 includes an imaging device 122 and a processing device 132, and a third unit 183 includes an imaging device 123 and a processing device 133. The inspection system illustrated in FIG. 1A will be described hereinafter with reference to a process flow diagram illustrated in FIG. 3.

Imaging Device

Figure 1B:
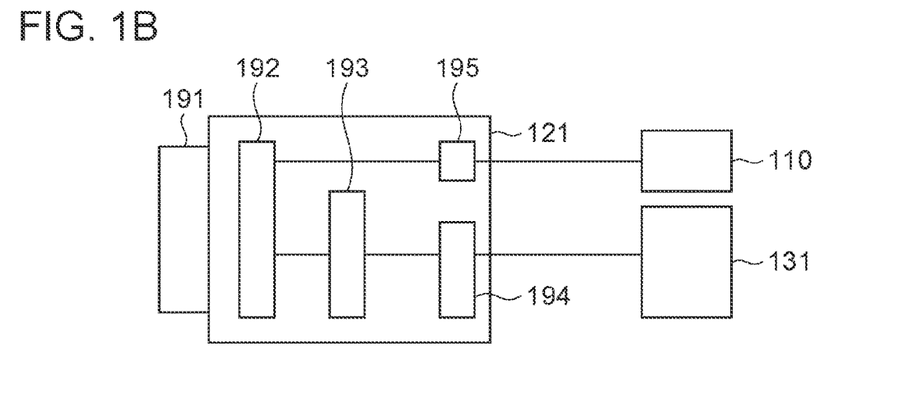
FIG. 1B is a diagram illustrating an overview of the inspection system.

FIG. 1B is a block diagram of functions of each of the imaging devices 121 to 123. FIG. 1B illustrates the imaging device 121, by way of example. The imaging device 121 includes a lens unit 191, an imaging element 192, a signal processing unit 193 that processes a signal output from the imaging element 192, and an output unit 194 that outputs image data generated by she signal processing unit 193. Each of the imaging devices 121 to 123 is provided with an image-capturing trigger signal input unit 195. In response to receipt of an image-capturing trigger signal, each of the imaging devices 121 to 123 starts capturing an image.

The lens unit 191 is disposed so as to be removable from each of the imaging devices 121 to 123, and an appropriate lens unit is selectable in accordance with the size of the imaging target or the image capturing scene.

The imaging element 192 is an element having photoelectric conversion units arranged in an array. Examples of the imaging element 192 include a complementary metal oxide semiconductor (CMOS) sensor. The imaging element 192 may be a roll-ng shutter imaging element in which the start and end of the exposure period are different line by line, or a global electronic shutter imaging element in which the start and end of the exposure period are the same for all lines. In this embodiment, the imaging system is assumed to be used for defect inspection of products (workpieces) manufactured on a production line. Thus, to follow workpieces moving at a high speed, it is desirable to use global electronic shutter imaging elements to more accurately capture images.

The signal processing unit 193 generates image data from the signal output from the imaging element 192.

The output unit 194 outputs the image data generated by the signal processing unit 193.

Sensor and Trigger Generation Circuit

A sensor 100 is, for example, a sensor for sensing a workpiece moving on the production line at a high speed. Examples of the sensor 100 include an infrared sensor. In response to the sensor 100 sensing a workpiece approaching the imaging device 121, a signal is output from the sensor 100 to a trigger generation circuit 110 (FIG. 3: step 310).

The trigger generation circuit 110 is constituted by, for example, a logic circuit such as a field-programmable gate array (FPGA) or an application-specific integrated circuit (ASIC). The trigger generation circuit 110 performs hardware processing on the signal input from the sensor 100 and provides an image-capturing trigger signal to the imaging devices 121 to 123 at the same time point (FIG. 3: step 320). The image-capturing trigger signals provided to the imaging devices 121 to 123 are referred to as a first trigger signal, a second trigger signal, and a third trigger signal, respectively.

Figure 3:
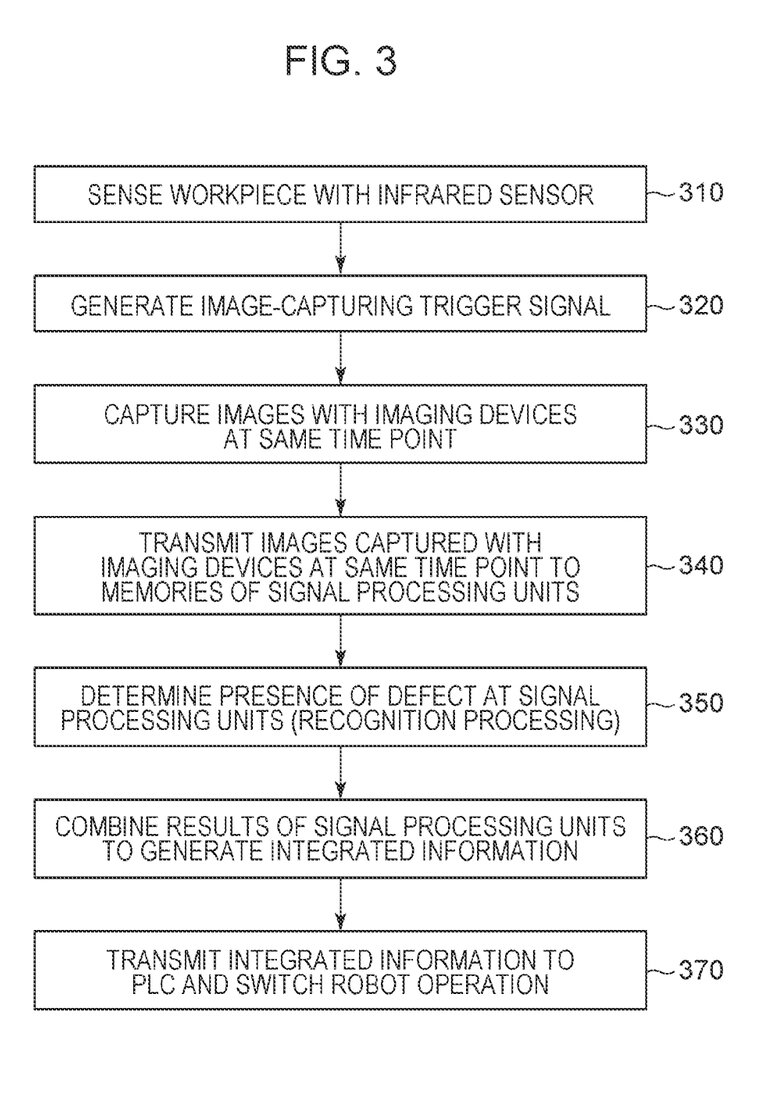
FIG. 3 is a process flow diagram of the inspection system.

Accordingly, the first to third trigger signals are transmitted to the imaging devices 121 to 123 at the same time point, respectively, and the imaging devices 121 to 123 capture images of the workpiece at the same time point (FIG. 3: step 330).

Preferably, the image-capturing trigger signal is transmitted from the trigger generation circuit 110 to the image-capturing trigger signal input units 195 of the imaging devices 121 to 123 via wired connection. Further, preferably, the distances from the trigger generation circuit 110 to the image-capturing trigger signal input units 195 of the imaging devices 121 to 123 are substantially equal to each other.

The term "at the same time point" means that a time delay as short as a clock skew of a logic circuit is allowed. For example, a delay within 1 μs can be "the same time point".

For example, the trigger generation circuit 110 distributes an input signal from the sensor 100 to generate output signals to he output from the trigger generation circuit 110. The trigger generation circuit 110 is constituted by a logic circuit and configured to perform parallel processing by hardware processing, which causes no unnecessary delay as compared with software processing in which sequential processing is performed. In other words, the imaging devices 121 to 123 are configured to be able to directly receive a signal from the trigger generation circuit 110, that is, configured to he able to receive the signals without software processing, and cause no unnecessary delay.

Processing Device

The image data output from the imaging device 121 (first imaging device) is input to the processing device 131 and subjected to data processing. Likewise, the image data output from the imaging device 122 (second imaging device) is input to the processing device 132 and subjected to data processing, and the image data output from the imaging device 123 (third imaging device) is input to the processing device 133 and subjected to data processing.

The processing devices 131 to 133 perform recognition processing on the imaging target of the respective pieces of image data. The recognition processing is processing for determining whether a workpiece as an imaging target has a defect.

The transmission of the image data from the imaging devices 121 to 123 to the processing devices 131 to 133 is preferably performed via wired connection.

Each of the imaging devices 121 to 123 includes a CPU 140 and a graphics processing unit (CPU) 150. Each of the CPU 140 and the CPU 150 includes a memory, and these memories hold the image data output from the corresponding one of the imaging devices 121 to 123 (FIG. 3: step 340).

As described above, since an image-capturing trigger signal is input to the imaging devices 121 to 123 at the same time point from the trigger generation circuit 110, the memories of the CPUs 150 and the CPUs 140 of the imaging devices 121 to 123 hold image data obtained at the same time point.

The CPUs 150 access the image data held in the memories and process the image data in parallel. Each of the CPUs 150 determines whether the workpiece has a defect by using a model that has learned. The GPU 150 is suitable for a larger amount of definite computation than the CPU 140. The CPU 150 is capable of rapidly performing a process of determining the presence of a defect from the image data of the workpiece.

The processing device 131 determines, based on the image data acquired by the imaging device 121, whether an area of the image data includes a defect (FIG. 3: step 350). Likewise, the processing device 132 determines whether an image area acquired by the imaging device 122 includes a defect, and the processing device 133 determines whether an image area acquired by the imaging device 123 includes a defect (FIG. 3: step 350). The determination results of the processing devices 132 and 133 are output to the processing device 131.

The processing device 131 combines the determination result of the processing device 131, the determination result of the processing device 132, and the determination result of the processing device 133 to generate integrated information. The integrated information is information for finally determining whether the workpiece has a defect (FIG. 3: step 360).

In the configuration illustrated in FIG. 1A, therefore, the first unit 181 is a master unit, and the second unit 182 and the third unit 183 are slave units.

The determination result integration process of the processing device 131 is performed not by the GPU 150 but by the CPU 140. The determination of the presence of a defect based on image data requires high-performance, high-speed matrix processing or the like. Thus, this processing is desirably performed by the CPU 150. In contrast, the integration of the determination results does not require high-performance matrix processing or the like and is thus performed by the CPU 140 to reduce the load on the GPU 150. To perform this processing, the CPU 140 accesses the determination results of the processing devices 131 to 133 held in the memory included in the CPU 140 of the processing device 131 and processes the information.

In addition, no high-speed signal transmission is required for output of the determination results from the processing devices 132 and 133 to the processing device 131. Thus, signal transfer can be performed via wired or wireless connection based on a general-purpose standard such as Ethernet.

Further, the processing devices 131 to 133 can respectively instruct the imaging devices 121 to 123 to change an exposure condition, a shutter speed condition, and the like if the image data contains blur or the like and an image capturing condition of the imaging devices 121 to 123 is not sufficient. In this case, a signal related to setting and control is input from the processing devices 131 to 133 to the imaging devices 121 to 123, respectively.

The processing device 131 outputs the final determination result. to a programmable logic controller (PLC) 160 (FIG. 3: step 370). If the final determination result indicates that the workpiece has a defect, the PLC 160 inputs a signal for operation control to a robot 170 (FIG. 3: step 370). The robot 170 switches the workpiece movement operation and removes the workpiece determined to have a defect from the production line (FIG. 3: step 370).

Example Arrangement of Imaging Devices

Figure 2A:
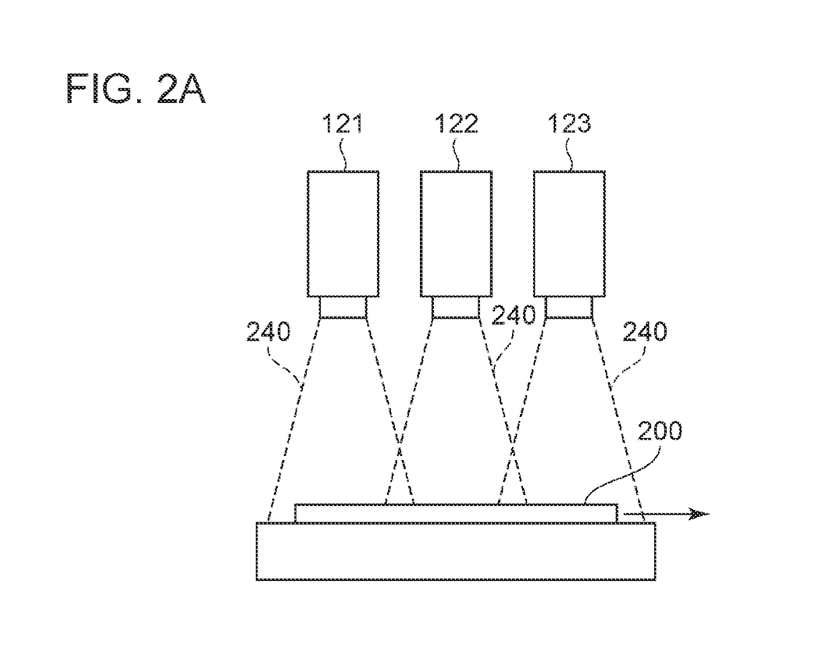
FIG. 2A is a diagram illustrating an example arrangement of imaging devices.

FIG. 2A illustrates an example arrangement of the imaging devices 121 to 123 along a production line. Imaging ranges (fields of view) 240 of the imaging devices 121 to 123 have overlapping areas.

Figure 2B:
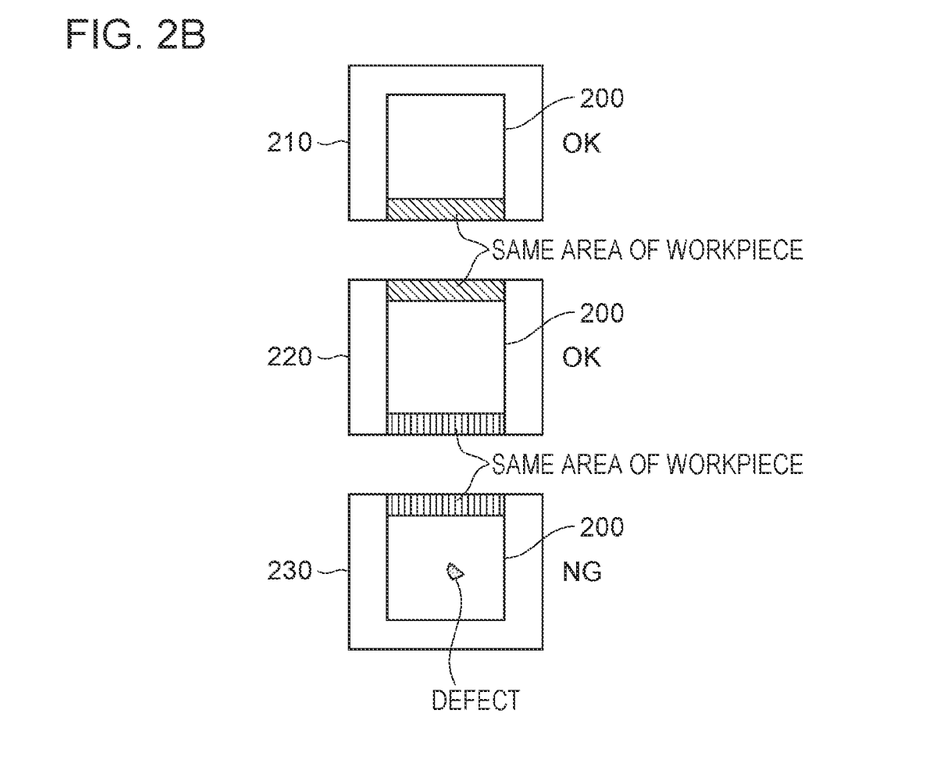
FIG. 2B is a diagram illustrating display examples of image data acquired by the imaging devices.

FIG. 2B illustrates display examples 210 to 230 of image data acquired by the imaging devices 121 to 123, respectively. Since the fields of view 240 of the imaging devices 121 and 122 overlap, the display example 210 of the image data acquired by the imaging device 121 and the display example 220 of the image data acquired by the imaging device 122 display the same area of a workpiece 200. Likewise, since the fields of view 240 of the imaging devices 122 and 123 overlap, the display example 220 of the image data acquired by the imaging device 122 and she display example 230 of the image data acquired by the imaging device 123 display the same area of the workpiece 200.

Since a plurality of imaging devices are disposed, even a workpiece having a size that does not fit in the field of view of a single imaging device can be checked to accurately determine the presence of a defect. In addition, the configuration in which the fields of view of the respective imaging devices overlap can prevent failure to capture an image of a portion of a workpiece.

Learning Model

Figure 4A:
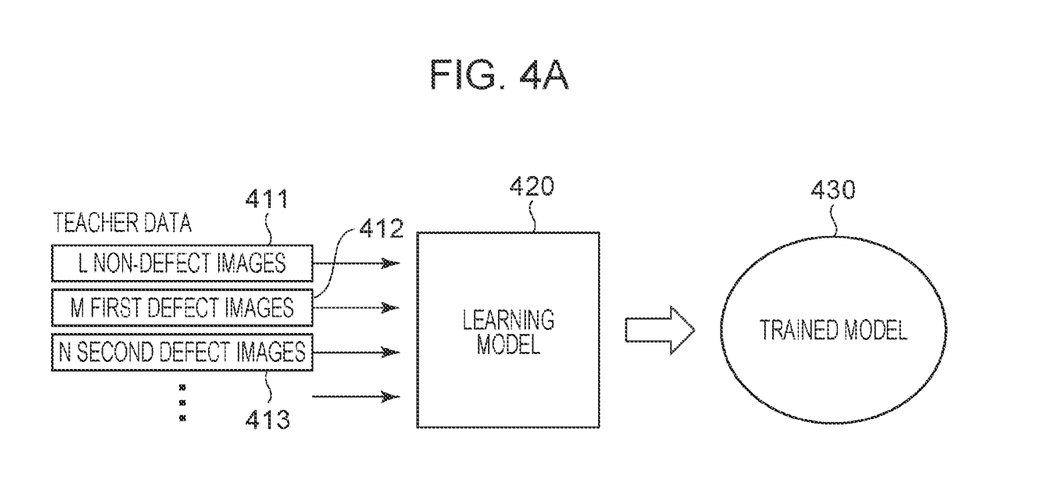
FIG. 4A is a diagram illustrating a learning model used in the inspection system.
Figure 4B:
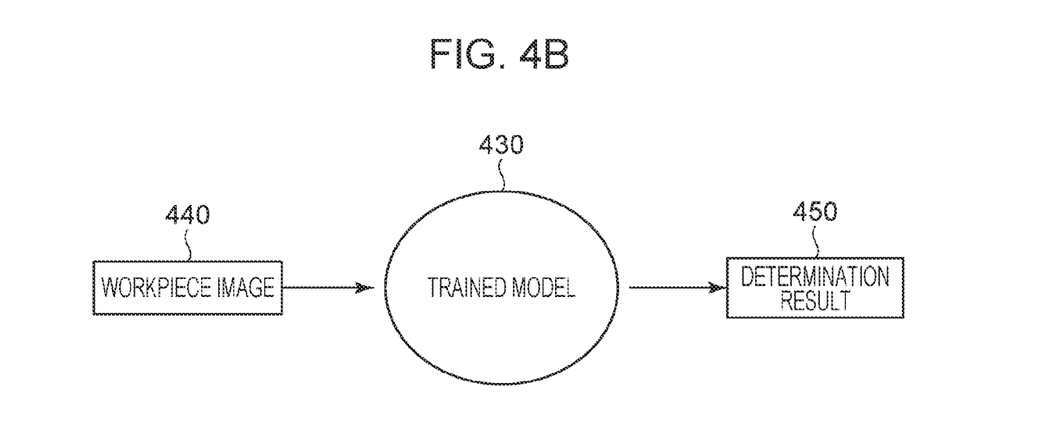
FIG. 4B is a diagram illustrating a learning model used in the inspection system.

FIGS. 4A and 4B are diagrams illustrating AI for performing workpiece defect determination performed by the GPUs 150 of the processing devices 131 to 133.

FIG. 4A is a conceptual diagram of a learning phase. A learning model 420 has an algorithm for defect determination. L non-defect images 411, M first defect images 412, N second defect images 413, and the like are input to the learning model 420 as teacher data. The algorithm of the learning model 420 is trained via AI to achieve a more accurate algorithm to obtain a trained model 430 that has learned.

Examples of a specific algorithm of machine learning include a nearest neighbor method, a Naive Bayes method, a decision tree, and a support vector machine. Other examples include deep learning that uses a neural network to generate a feature quantity and a connection weighting coefficient for learning by itself. For example, a convolutional neural network (CNN) model may be used as a model of deep learning.

FIG. 4B is a conceptual diagram of an estimation phase. In response to a workpiece image 440 being input to the trained model 430 created in the learning phase, a result 450 of determining whether a defect is present is output. The process using the trained model 430 is executed by the GPU 150.

Second Embodiment

Figure 5:
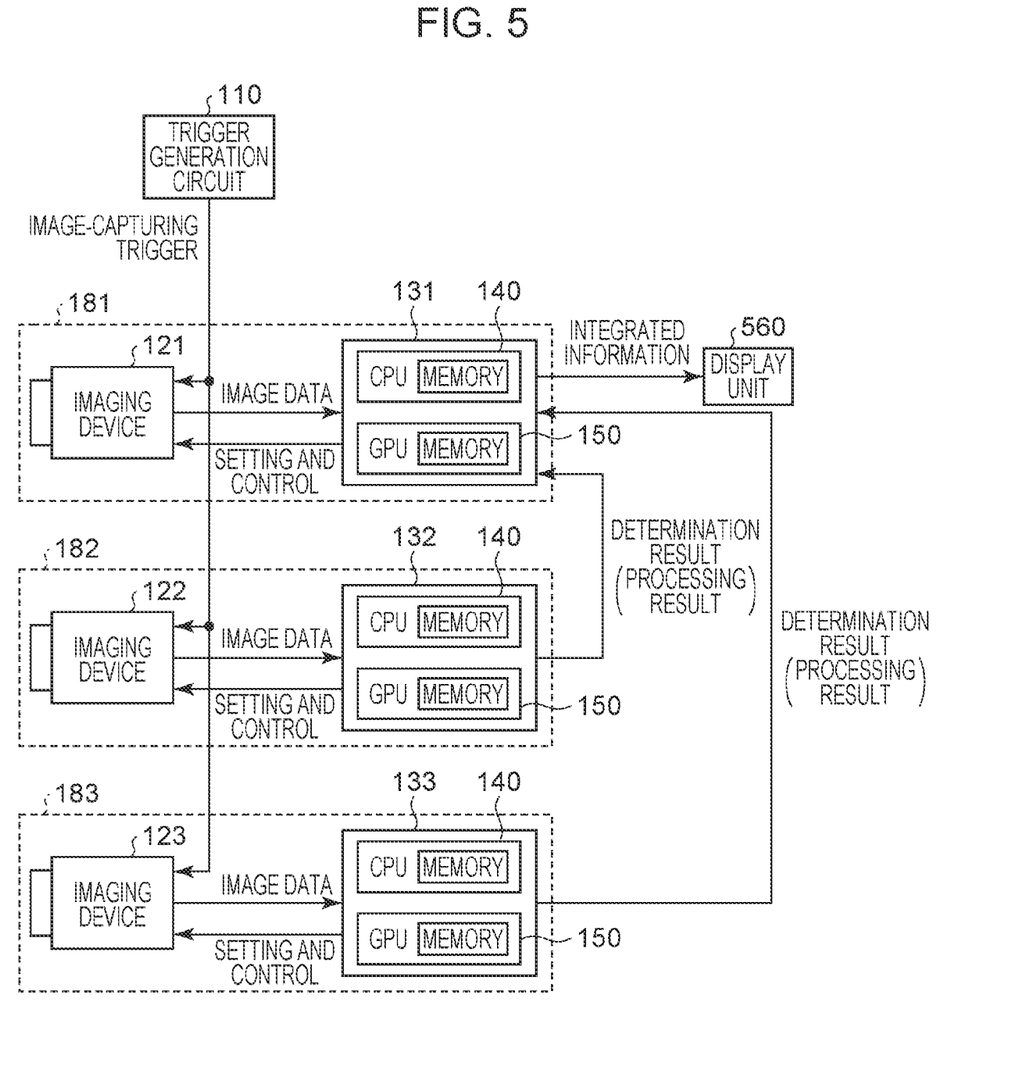
FIG. 5 is a diagram illustrating an overview of a monitoring system.

In the first embodiment described above, an imaging system for determining the presence of a defect in a workpiece has been described above. A second embodiment provides an imaging system applicable to a monitoring system. The imaging system will be described with reference to FIGS. 5 and 6. In FIG. 5, blocks denoted by the same reference numerals as those in FIG. 1A are blocks having substantially the same functions.

Figure 6:
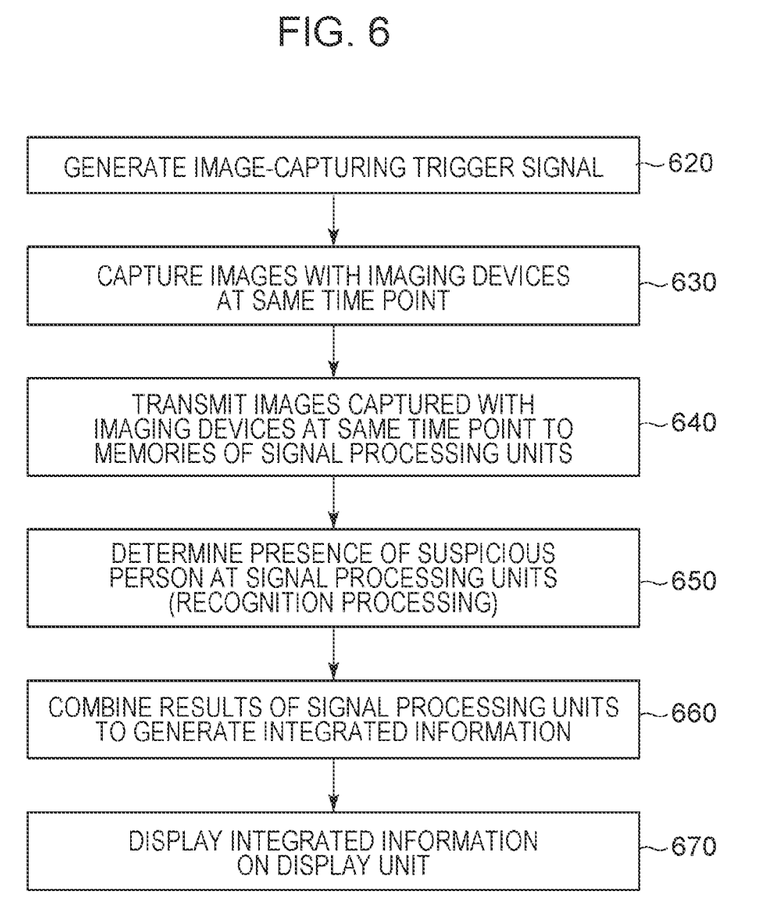
FIG. 6 is a process flow diagram of the monitoring system.

The trigger generation circuit 110 is constituted by, for example, a logic circuit such as an FPGA or an ASIC. The trigger generation circuit 110 provides an image-capturing trigger signal to the imaging devices 121 to 123 at the same time point (FIG. 6: step 620). Accordingly, the imaging devices 121 to 123 capture images of a subject at the same time point (FIG. 6: step 630).

In this embodiment, the image-capturing trigger signal is generated, for example, in response to receipt of an external trigger indicating that a suspicious object has been found in a nearby area or in response to receipt of an external trigger indicating that a suspicious person has been seen in a nearby area.

Preferably, the image-capturing trigger signal is transmitted from the trigger generation circuit 110 to the image-capturing trigger signal input units 195 of the imaging devices 121 to 123 via wired connection. Further, preferably, the distances from the trigger generation circuit 110 to the image-capturing trigger signal input units 195 of the imaging devices 121 to 123 are substantially equal to each other.

The trigger generation circuit 110 is constituted by a logic circuit and configured to perform parallel processing by hardware processing, which causes no unnecessary delay as compared with software processing in which sequential processing is performed. That is, the imaging devices 121 to 123 are configured to be able to directly receive a signal from the trigger generation. circuit 110 without software processing, and cause no unnecessary delay.

The image data output from the imaging device 121 is input to the processing device 131 and subjected to data processing. Likewise, the image data output from the imaging device 122 is input to the processing device 132 and subjected to data processing, and the image data output from the imaging device 123 is input to the processing device 133 and subjected to data processing.

The processing devices 131 to 133 perform recognition processing on the imaging target of the respective pieces of image data. The recognition processing is processing for determining whether a plurality of persons as imaging targets include a suspicious person.

The transmission of the image data from the imaging devices 121 to 123 to the processing devices 131 to 133 is preferably performed via wired connection.

Each of the imaging devices 121 to 123 includes the CPU 140 and the GPU 150. Each of the CPU 140 and the CPU 150 includes a memory, and these memories hold the respective pieces of image data output from the imaging devices 121 to 123 (FIG. 6: step 640).

As described above, since an image-capturing trigger signal is input to the imaging devices 121 to 123 at the same time point from the trigger generation circuit 110, the memories of the CPUs 150 and the CPUs 140 of the imaging devices 121 to 123 hold image data obtained at the same time point.

The CPUs 150 access the image data held in the memories and process the image data in parallel. Each of the CPUs 150 determines whether a plurality of persons as targets include a suspicious persons, by using a model that has learned. With respect to the trained model, for example, data having information on suspicious persons is used as teacher data to perform machine learning. Alternatively, as described above with reference to FIGS. 4A and 4B and the description with reference to FIGS. 4A and 4B, deep learning may be used.

The GPU 150 is suitable for a =artier amount of definite computation than the CPU 140. The GPU 150 is capable of rapidly performing a process of determining the presence of a suspicious person from image data including a plurality of persons.

The processing device 131 determines, based on the image data acquired by the imaging device 121, whether a suspicious person is present in an area of the image data (FIG. 5: step 650). Likewise, the processing device 132 determines whether a suspicious person is present in an image area acquired. by the imaging device 122, and the processing device 133 determines whether a suspicious person is present in an image area acquired by the imaging device 123 (FIG. 5: step 650). The determination results of the processing devices 132 and 133 are output to the processing device 131.

The processing device 131 combines the determination result of the processing device 131, the determination result of the processing device 132, and the determination result of the processing device 133 to generate integrated. information. The integrated information is information for finally determining whether a suspicious person is present (FIG. 6: step 660).

The determination result integration process of the processing device 131 is performed not by the CPU 150 but by the CPU 140. The determination of the presence of a suspicious person based on image data requires high-performance, high-speed matrix processing or the like. Thus, this processing is desirably performed by the CPU 150. In contrast, the integration of the determination results does not require high-performance matrix processing or the like and is thus performed by the CPU 140 to reduce the load on the CPU 150. To perform this processing, the CPU 140 accesses the determination results of the processing devices 131 to 133 held in the memory included in the CPU 140 of the processing device 131 and processes the information.

The processing device 131 outputs the final determination result to a display unit 560 (FIG. 6: step 670).

In the example described above, the presence of a suspicious person is determined. However, recognition processing for counting the number of objects or persons included in image data captured by each imaging device. That is, the recognition processing may count the number of targets included in the first image data and the number of targets included in the second image data.

Other Embodiments

In FIG. 1A, one processing device is provided for one imaging device. Alternatively, one or two processing devices may be provided for three imaging devices. However, it is preferable that one processing device is provided for one imaging device because the signal processing speed is not delayed.

While FIG. 1A discloses an example in which each of the CPU 150 and the CPU 140 includes a memory, only the CPU 150 may include a memory and the CPU 140 may access the memory in the 150. Alternatively, a memory may be disposed in a location other than the CPU 150 and the CPU 140, and the CPU 150 and the CPU 140 may access the memory.

While FIG. 1A illustrates an example in which each of the processing devices 132 and 133 includes a CPU, the processing devices 132 and 133 may include no CPU. In this case, the CPU included in the processing device 131 performs processing.

In addition, each of the processing devices 131 to 133 may include a rule-based algorithm for performing typical image processing such as edge processing of a workpiece in image data and may be configured to execute this algorithm.

Additionally, the embodiments described above may be combined with each other.

The present invention is not limited to the embodiments described above and may be changed and modified in various ways without departing from the spirit and scope of the present invention. Therefore, to apprise the public of the scope of the present invention, the following claims are appended.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging system comprising:
a first camera configured to receive a trigger signal directly from a trigger generation circuit independent from a controller;

a second camera configured to receive the trigger signal directly from the trigger generation circuit independent from the controller;
a memory configured to hold first image data captured by the first camera in response to receipt of the trigger signal and second image data captured by the second camera in response to receipt of the trigger signal; and
a plurality of processors configured to process the first image data and the second image data held in the memory,
wherein the trigger signal is a signal generated to allow the first camera and the second camera to start capturing an image at the same time point,
wherein the trigger generation circuit performs hardware processing on a signal received from a sensor to transmit to the first camera and the second camera,
wherein the plurality of processors perform recognition processing of a target included in the first image data and the second image data.

2. The imaging system according to claim 1, wherein the plurality of processors each include a first processor and a second processor,
wherein the first processor accesses the memory in which the first image data is held, and performs the recognition processing of the target included in the first image data, and
wherein the second processor accesses the memory in which the second image data is held, and performs the recognition processing of the target included in the second image data.

3. The imaging system according to claim 2, wherein the memory includes a first memory and a second memory,
wherein the first image data is held in the first memory, the first memory being included in the first processor, and
wherein the second image data is held in the second memory, the second memory being included in the second processor.

4. The imaging system according to claim 2, wherein the first processor includes a first graphics processing unit (GPU),
wherein the second processor includes a second GPU,
wherein the first GPU performs the recognition processing of the target included in the first image data, and
wherein the second GPU performs the recognition processing of the target included in the second image data.

5. The imaging system according to claim 2, wherein the second processor outputs a result of the recognition processing performed by the second processor to the first processor,
wherein the first processor combines information on a result of the recognition processing performed by the first processor and information on the result of the recognition processing performed by the second processor to generate integrated information, and
wherein the first processor outputs the integrated information.

6. The imaging system according to claim 5, wherein the first processor includes a central processing unit (CPU), and
wherein the integrated information is generated by the CPU.

7. The imaging system according to claim 1, wherein the first camera and the second camera are disposed such that an imaging range of the first camera and an imaging range of the second camera overlap.

8. The imaging system according to claim 1, wherein the first image data and the second image data are pieces of image data captured at the same time point.

9. The imaging system according to claim 1, wherein the recognition processing is processing for determining whether the target includes a defect.

10. The imaging system according to claim 1, wherein the recognition processing is processing for determining whether the target includes a suspicious person.

11. The imaging system according to claim 1, wherein the recognition processing counts a number of targets included in the first image data and a number of targets included in the second image data.

12. An imaging system comprising:
a first camera configured to receive a trigger signal directly from a trigger generation circuit independent from a controller;
a second camera configured to receive the trigger signal directly from the trigger generation circuit independent from the controller; and
a plurality of processors configured to process first image data captured by the first camera in response to receipt of the trigger signal and second image data captured by the second camera in response to receipt of the trigger signal,
wherein the trigger signal is a signal generated to allow the first camera and the second camera to start capturing an image at the same time point,
wherein the trigger generation circuit performs hardware processing on a signal received from a sensor to transmit to the first camera and the second camera, and
wherein the plurality of processors performs recognition processing of a target included in the first image data and the second image data.

13. The imaging system according to claim 12, wherein the plurality of processors includes a first processor and a second processor,
wherein the first processor performs the recognition processing of the target included in the first image data, and
wherein the second processor performs the recognition processing of the target included in the second image data.

14. The imaging system according to claim 13, wherein the first processor includes a first graphics processing unit (GPU),
wherein the second processor includes a second GPU,
wherein the first GPU performs the recognition processing of the target included in the first image data, and
wherein the second GPU performs the recognition processing of the target included in the second image data.

15. The imaging system according to claim 13, wherein the second processor outputs a result of the recognition processing performed by the second processor to the first processor,
wherein the first processor combines information on a result of the recognition processing performed by the first processor and information on the result of the recognition processing performed by the second processor to generate integrated information, and
wherein the first processor outputs the integrated information.

* * * * *